United States Patent
Wang (10) Patent No.: US 12,282,435 B2
(45) Date of Patent: Apr. 22, 2025

(54) MEMORY SYSTEM AND METHOD OF OPERATING THEREOF, STORAGE MEDIUM AND MEMORY CONTROLLER

(71) Applicant: YANGTZE MEMORY TECHNOLOGIES CO., LTD., Wuhan (CN)

(72) Inventor: Hao Wang, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 0 days.

(21) Appl. No.: 18/237,784

(22) Filed: Aug. 24, 2023

(65) Prior Publication Data
US 2024/0403222 A1 Dec. 5, 2024

Related U.S. Application Data

(63) Continuation of application No. PCT/CN2023/097441, filed on May 31, 2023.

(51) Int. Cl.
*G06F 12/1009* (2016.01)

(52) U.S. Cl.
CPC .... *G06F 12/1009* (2013.01); *G06F 2212/171* (2013.01); *G06F 2212/2022* (2013.01); *G06F 2212/7202* (2013.01)

(58) Field of Classification Search
CPC ........... G06F 12/1009; G06F 2212/171; G06F 2212/2022; G06F 2212/7202
See application file for complete search history.

(56) References Cited

U.S. PATENT DOCUMENTS

| | | | |
|---|---|---|---|
| 2016/0342509 A1 | 11/2016 | Kotte et al. | |
| 2020/0089617 A1* | 3/2020 | Onishi | G06F 12/0246 |
| 2020/0201547 A1* | 6/2020 | Jung | G06F 12/0802 |

FOREIGN PATENT DOCUMENTS

| | | | |
|---|---|---|---|
| CN | 104268094 A | | 1/2015 |
| CN | 111324552 A | | 6/2020 |
| CN | 113297099 A | | 8/2021 |
| CN | 115185858 A | | 10/2022 |
| KR | 20120037218 A | | 4/2012 |

* cited by examiner

*Primary Examiner* — Kalpit Parikh
(74) *Attorney, Agent, or Firm* — BAYES PLLC (57) ABSTRACT

According to one aspect of the present disclosure, a memory system is provided. The memory system may include at least one non-volatile memory device and a memory controller coupled to the at least one non-volatile memory device. A multi-level mapping table may be stored in the memory device. The multi-level mapping table may be configured to implement mapping from a logical address to a physical address. The memory controller may include a buffer. A portion of the multi-level mapping table may be stored in the buffer. The memory controller may be configured to perform a random read operation on the data stored in the memory device. In response to a random read range corresponding to the random read operation meeting a preset condition, the memory controller may be configured to adjust capacity for storing different levels of mapping tables in the buffer.

20 Claims, 4 Drawing Sheets

MEMORY SYSTEM AND METHOD OF OPERATING THEREOF, STORAGE MEDIUM AND MEMORY CONTROLLER

CROSS-REFERENCE TO RELATED APPLICATIONS

This application is a continuation of International Application No. PCT/CN2023/097441, filed on May 31, 2023, which is incorporated herein by reference in its entirety.

FIELD OF TECHNOLOGY

An example of the present disclosure relates to the field of semiconductor technology, and in particular, a memory system and method of operating thereof, storage medium and memory controller.

BACKGROUND

A memory device is a memory apparatus configured to maintain information in modern information technology. A flash memory, as a typical non-volatile semiconductor memory, has several advantages, such as, high storage density, controllable cost of production, suitable speed for programming and erasing, and retention characteristics, etc. For these reasons, flash memory is becoming more prevalent in the storage market.

A memory system, such as, a Solid-State Drive (SSD) for personal computer and server, and Universal Flash Storage (UFS) for a mobile phone and various embedded systems, may include a flash memory as its permanent storage medium.

SUMMARY

According to one aspect of the present disclosure, a memory system is provided. The memory system may include at least one non-volatile memory device and a memory controller coupled to the at least one non-volatile memory device. A multi-level mapping table may be stored in the memory device. The multi-level mapping table may be configured to implement mapping from a logical address to a physical address. The memory controller may include a buffer. A portion of the multi-level mapping table may be stored in the buffer. The memory controller may be configured to perform a random read operation on the data stored in the memory device. In response to a random read range corresponding to the random read operation meeting a preset condition, the memory controller may be configured to adjust capacity for storing different levels of mapping tables in the buffer.

In some implementations, the multi-level mapping table may include a first-level mapping table, a second-level mapping table, and a third-level mapping table. In some implementations, a physical address of the second-level mapping table may be stored in the first-level mapping table. In some implementations, a physical address of the third-level mapping table may be stored in the second-level mapping table. In some implementations, a physical address of data may be stored in the third-level mapping table. In some implementations, the whole first-level mapping table, a portion of the second-level mapping table, and a portion of the third-level mapping table may be stored in the buffer.

In some implementations, the memory controller may be configured to, in response to the random read range being greater than or equal to a preset value, increase a ratio of a capacity for storing the second-level mapping table to a total capacity for storing the second-level mapping table and the third-level mapping table in the buffer.

In some implementations, the memory controller may be configured to, in response to the random read range being greater than or equal to a preset value, obtain a target buffer hit rate of mapping table. In some implementations, the memory controller may be configured to detect the current buffer hit rate of mapping table. In some implementations, the memory controller may be configured to, in response to the current buffer hit rate of mapping table being lower than the target buffer hit rate of mapping table, increase the ratio of the capacity for storing the second-level mapping table to the total capacity for storing the second-level mapping table and the third-level mapping table in the buffer until the current buffer hit rate of mapping table is greater than or equal to the target buffer hit rate of mapping table.

In some implementations, the memory controller may be configured to determine a difference between the current buffer hit rate of mapping table and the target buffer hit rate of mapping table. In some implementations, the memory controller may be configured to, according to the difference, determine increasing quantity of the capacity for storing the second-level mapping table in the buffer in this adjustment. In some implementations, the increasing quantity may be positively correlated with the difference.

In some implementations, the memory controller may be configured to, in response to the current buffer hit rate of mapping table being lower than the target buffer hit rate of mapping table, and the ratio of the current capacity for storing the second-level mapping table to the total capacity for storing the second-level mapping table and the third-level mapping table in the buffer reaching a preset ratio, stop adjusting the capacity for storing different levels of mapping tables in the buffer.

In some implementations, the memory controller may be configured to determine the target buffer hit rate of mapping table according to the random read range.

In some implementations, the memory controller may be configured to, in response to the random read range being less than the preset value, maintain the capacity for storing the second-level mapping table and the capacity for storing the third-level mapping table in the buffer being unchanged.

In some implementations, the memory controller may be configured to determine the preset value according to the current capacity for storing the second-level mapping table in the buffer and in combination with mapping rules for various levels of mapping tables.

In some implementations, the memory controller may be configured to, in response to the random read range being greater than or equal to a preset value, increase the total capacity for storing the second-level mapping table and the third-level mapping table in the buffer.

In some implementations, the multi-level mapping table may include a first-level mapping table and a second-level mapping table. In some implementations, a physical address of the second-level mapping table may be stored in the first-level mapping table. In some implementations, a physical address of data may be stored in the second-level mapping table. In some implementations, a portion of the first-level mapping table and a portion of the second-level mapping table may be stored in the buffer. In some implementations, the memory controller may be configured to, in response to the random read range being greater than or equal to a preset value, increase the ratio of the capacity for storing the first-level mapping table to the total capacity for storing the first-level mapping table and the second-level mapping table in the buffer.

In some implementations, the memory system may include a dynamic random access memory (DRAM)-less memory system and the buffer includes a static random access memory (SRAM).

In some implementations, the memory system may include a flash storage, and the memory device includes a NOT AND (NAND) memory.

According to another aspect of the present disclosure, a method of operating a memory system is provided. The memory system may include at least one non-volatile memory device and a memory controller coupled to the at least one non-volatile memory device. A multi-level mapping table may be stored in the memory device. The multi-level mapping table may be configured to implement mapping from a logical address to a physical address. The memory controller may include a buffer, and a portion of the multi-level mapping table may be stored in the buffer. The method may include performing, by the memory controller, a random read operation on the data stored in the memory device. The method may include, in response to the random read range corresponding to the random read operation meeting a preset condition, adjusting, by the memory controller, the capacity for storing different levels of mapping tables in the buffer.

In some implementations, the multi-level mapping table may include a first-level mapping table, a second-level mapping table, and a third-level mapping table. In some implementations, a physical address of the second-level mapping table may be stored in the first-level mapping table. In some implementations, a physical address of the third-level mapping table may be stored in the second-level mapping table. In some implementations, a physical address of data may be stored in the third-level mapping table. In some implementations, the whole first-level mapping table, a portion of the second-level mapping table, and a portion of the third-level mapping table may be stored in the buffer. In some implementations, the method may include adjusting the capacity for storing different levels of mapping tables in the buffer in response to the random read range corresponding to the random read operation meeting a preset condition. In some implementations, the method may include, in response to the random read range being greater than or equal to a preset value, increasing the ratio of the capacity for storing the second-level mapping table to the total capacity for storing the second-level mapping table and the third-level mapping table in the buffer.

In some implementations, the method may include, in response to the random read range being greater than or equal to a preset value, increasing the ratio of the capacity for storing the second-level mapping table to the total capacity for storing the second-level mapping table and the third-level mapping table in the buffer. In some implementations, the method may include, in response to the random read range being greater than or equal to a preset value, obtaining a target buffer hit rate of mapping table; detecting the current buffer hit rate of mapping table. In some implementations, the method may include, in response to the current buffer hit rate of mapping table being lower than the target buffer hit rate of mapping table, increasing the ratio of the capacity for storing the second-level mapping table to the total capacity for storing the second-level mapping table and the third-level mapping table in the buffer until the current buffer hit rate of mapping table is greater than or equal to the target buffer hit rate of mapping table.

In some implementations, the method may include determining the difference between the current buffer hit rate of mapping table and the target buffer hit rate of mapping table. In some implementations, the method may include according to the difference, determining increasing quantity of the capacity for storing the second-level mapping table in the buffer in this adjustment. In some implementations, the increasing quantity may be positively correlated with the difference.

In some implementations, the method may include, in response to the current buffer hit rate of mapping table being lower than the target buffer hit rate of mapping table, and the ratio of the current capacity for storing the second-level mapping table to the total capacity for storing the second-level mapping table and the third-level mapping table in the buffer reaching a preset ratio, stop adjusting the capacity for storing different levels of mapping tables in the buffer.

According to a further aspect of the present disclosure, a storage medium having executable instructions stored thereon, which when executed by a processor, implement the operations of the method of any one of the above-described implementations is provided.

According to still another aspect of the present disclosure, a memory controller is provided. The memory controller may include a buffer and a control component. The buffer may be configured to store a portion of a multi-level mapping table in the non-volatile memory device. The multi-level mapping table may be configured to implement mapping from a logical address to a physical address. The control component may be configured to perform a random read operation on the data stored in the memory device. The control component may be configured to, in response to the random read range corresponding to the random read operation meeting a preset condition, adjust the capacity for storing different levels of mapping tables in the buffer.

In some implementations, the memory controller may further include a flash translation layer, which connects the control component and the buffer. In some implementations, the flash translation layer may be configured to translate the logical address into a corresponding physical address according to the mapping information in the multi-level mapping table stored in the buffer.

In some implementations, the control component may be configured to receive instructions from a host to perform read, write and erase operations on the memory device. In some implementations, the buffer may be configured to temporarily store data transferred between the host and the memory device. In some implementations, the memory controller may further include an encoder/decoder, for encoding and decoding data transferred between the host and the memory device.

According to yet a further aspect of the present disclosure, another memory system is provided. The memory system may include at least one non-volatile memory device and a memory controller coupled to the at least one non-volatile memory device. A multi-level mapping table may be stored in the memory device. The multi-level mapping table may be configured to implement mapping from a logical address to a physical address. The memory controller may include a buffer, and a portion of the multi-level mapping table may be stored in the buffer. The memory controller may be configured to perform a random read operation on the data stored in the memory device. The memory controller may be configured to, in response to the random read range corresponding to the random read operation meeting a preset condition, adjust the quantity of the capacity for different levels of mapping tables in one loading from the memory device to the buffer.

In a memory system provided by an implementation of the present disclosure, a memory device may store a multi-level mapping table. The buffer of the memory controller may be configured to load a portion of the multi-level mapping table. When the random read range meets a preset condition, the memory controller may adjust the capacity for storing different levels of mapping tables in the buffer. In this way, in one aspect, when a random read operation for a large range is performed, the memory controller may increase the capacity for storing at least one level of the mapping table in the buffer. This may improve the buffer hit rate of mapping table, and consequently, the time used to update the mapping table from the memory device to the buffer may be reduced, the time used for searching the corresponding mapping table may be reduced, and the performance of a random read for a large range in the memory system may be improved. In another aspect, dynamically adjusting the capacity for storing different levels of mapping tables in the buffer may improve utilization of the buffer and have little impact on other task scheduling, thereby mitigating buffer resource competition.

DETAILED DESCRIPTION

Illustrated examples of the present disclosure will be described in more detail below with reference to the accompanying drawings. Although illustrated examples of the present disclosure are shown in the accompanying drawings, it should be understood that the present disclosure may be implemented in various forms and should not be limited to the specific examples set forth herein. Rather, these examples are provided so that the present disclosure can be more thoroughly understood, and the scope of the present disclosure can be fully conveyed to those skilled in the art.

In the following description, numerous specific details are given in order to provide a more thorough understanding of the present disclosure. However, it will be apparent to one skilled in the art that the present disclosure may be practiced without one or more of these details. In other examples, in order to avoid confusion with the present disclosure, some technical features which are well known in the art are not described. That is, not all features of the actual example are described here, and well-known functions and structures are not described in detail.

In the accompanying drawings, the depicted size of a layer, a region, and an element, as well as their relative sizes, may be exaggerated for clarity. Moreover, like reference numerals refer to like elements throughout the figures and the following description.

It will be understood that when an element or layer is referred to as being "on," "adjacent to," "connected to" or "coupled to" another element or layer, it may be directly on, adjacent to, connected to or coupled to another element or layer, or intervening elements or layers may be present. In contrast, when an element is referred to as being "directly on," "directly adjacent to," "directly connected to" or "directly coupled to" another element or layer, there is no intervening elements or layers present. It will be understood that, although the terms first, second, third etc., may be configured to describe various elements, components, regions, layers and/or parts, these elements, components, regions, layers and/or parts should not be limited by these terms. These terms are only configured to distinguish one element, component, region, layer or part from another element, component, region, layer or part. Thus, a first element, component, region, layer, or part discussed below may be termed as a second element, component, region, layer, or part without departing from teachings of the present disclosure. In some implementations, when a second element, component, region, layer or part is discussed, it does not indicate that a first element, component, region, layer or part necessarily presents in the present disclosure.

The spatially relative terms such as "beneath", "below", "lower", "under", "above", "on", etc., may be used herein for ease of description to describe one element or feature's relationship to another element(s) or feature(s) as illustrated in the figures. It will be understood that the spatially relative terms are intended to encompass different orientations of the device in use or operations in addition to the orientation depicted in the figures. For example, if the device in the appended drawings is turned over, an element or a feature described as "below" or "beneath" or "under" another element or feature would then be oriented "above" the another element or feature. Thus, example terms "below" and "under" may encompass both directions of up and down. A device may be otherwise oriented (rotated 90 degrees or at other orientations) and the spatially relative descriptors used herein should be interpreted accordingly.

A term used herein is for the purpose of describing a particular example only and is not to be considered as limitation of the present disclosure. As used herein, the singular forms "a", "an" and "said/the" are intended to include the plural forms as well, unless the context clearly dictates otherwise. It should also be understood that the terms "consists of" and/or "including", when used in this description, identify the presence of stated features, integers, operations, operations, elements and/or parts, but do not exclude the presence or addition of one or more other features, integers, operations, operations, elements, parts and/or groups. As used herein, the term "and/or" includes any and all combinations of the associated listed items.

In order to understand the characteristics and technical content of examples of the present disclosure in more detail, examples of the present disclosure will be described in detail below in conjunction with the accompanying drawings. However, the accompanying drawings are for reference and description only, and are not intended to limit examples of the present disclosure.

Memory devices in examples of the present disclosure include but are not limited to a three-dimensional NAND memory. Instead, for ease of understanding, a three-dimensional NAND memory is used as a non-limiting example for illustration.

Figure 1:
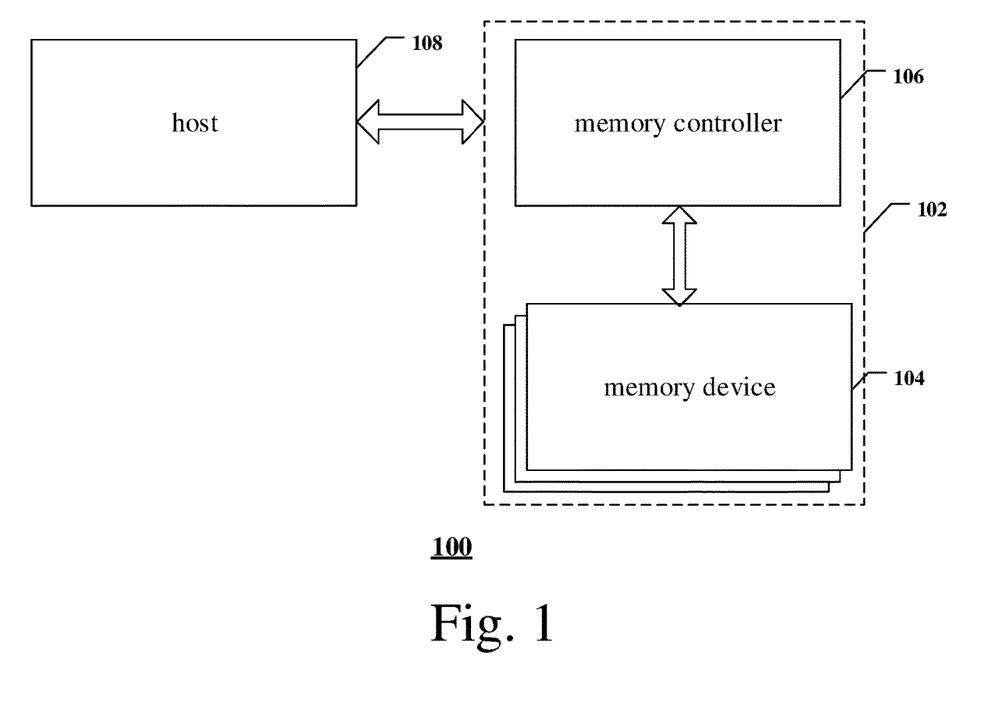
FIG. 1 is a schematic diagram of an example system including a memory device, according to some implementations of the present disclosure.

FIG. 1 illustrates a block diagram of an example system 100 with memory devices in accordance with some aspects of the present disclosure. The system 100 may be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having memory device therein. As shown in in FIG. 1, system 100 may include a host 108 and a memory system 102, and the memory system 102 has one or more memory devices 104 and a memory controller 106. The host 108 may be a processor of an electronic device (e.g., a central processing unit (CPU)) or a system-on-chip (SoC) (e.g., an application processor (AP)). Host 108 may be configured to send data to or receive data from memory device 104.

According to some examples, memory controller 106 is coupled to memory device 104, and host 108 and is configured to control memory device 104. Memory controller 106 may manage data stored in memory device 104 and communicate with host 108. In some examples, memory controller 106 is designed to operate in low duty cycle environments, e.g., Secure Digital (SD) card, Compact Flash (CF) card, Universal Serial Bus (USB) flash drive, or other media for use in electronic devices such as personal computer, digital camera, mobile phone, etc. In some examples, the memory controller 106 is designed to operate in a high duty-cycle environment solid state drive or embedded multimedia card (eMMC), where SSDs or eMMCs are used as data storage for mobile devices such as smartphone, tablet computer, laptop computer, and enterprise storage array.

Memory controller 106 may be configured to control operations of memory device 104, e.g., read, erase and program operations. Memory controller 106 may also be configured to manage various functions related to data stored or to be stored in memory device 104, including but not limited to bad block management, garbage collection, logical-to-physical address translation, wear leveling, etc. In some examples, memory controller 106 is also configured to process error correction code (ECC) related to data read from or written to memory device 104. Memory controller 106 may also perform any other suitable functions, e.g., formatting memory device 104. Memory controller 106 may communicate with a host (e.g., host 108) according to a particular communication protocol. For example, the memory controller 106 may communicate with a host through at least one of various interface protocols, e.g., USB protocol, MMC protocol, Peripheral Component Interconnect (PCI) protocol, PCI Express (PCI-E) protocol, advanced Technology Attachment (ATA) protocol, Serial ATA protocol, Parallel ATA protocol, Small Computer Small Interface (SCSI) protocol, Enhanced Small Disk Interface (ESDI) protocol, Integrated Drive Electronics (IDE) protocol, Firewire protocol, etc.

Figure 2A:
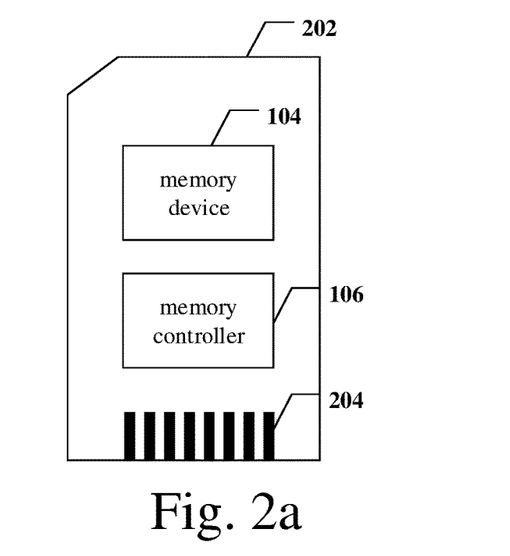
FIG. 2a is a schematic diagram of a memory card, according to some implementations of the present disclosure.
Figure 2B:
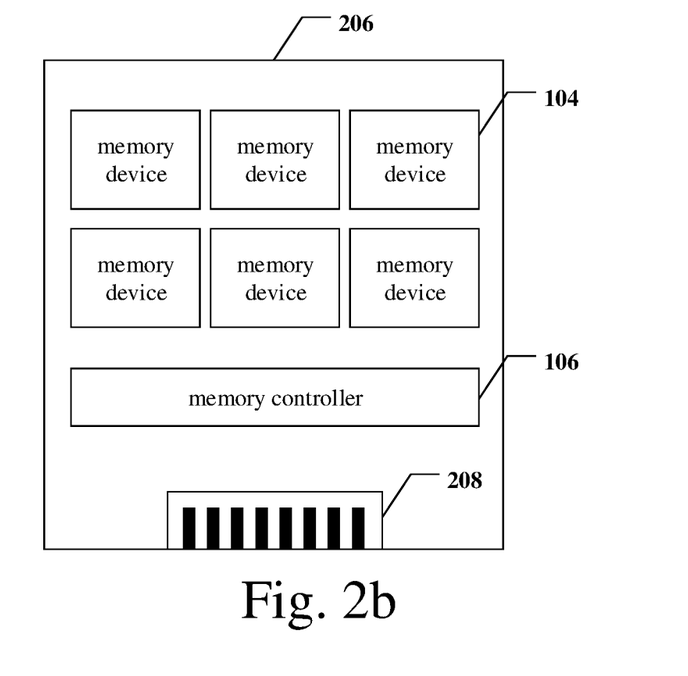
FIG. 2b is a schematic diagram of a SSD, according to some implementations of the present disclosure.

Memory controller 106 and one or more memory devices 104 may be integrated into various types of storage devices, e.g., included in the same package (e.g., Universal Flash Storage package or eMMC package). That is, memory system 102 may be implemented and packaged into different types of end electronic products. In one example as shown in FIG. 2a, memory controller 106 and a single memory device 104 may be integrated into a memory card 202. Memory card 202 may include a PC card (e.g., personal computer memory card international association (PCM-CIA)), a CF card, a smart media (SM) card, a memory stick, a multimedia card (MMC) (e.g., reduced sized (RS)-MMC, MMCmicro, etc.), an SD card (e.g., miniSD, microSD, SD high capacity (SDHC), etc.), a UFS, etc. Memory card 202 may further include a memory card connector 204 coupling memory card 202 with a host (e.g., host 108 in FIG. 1). In another example as shown in FIG. 2b, memory controller 106 and multiple memory devices 104 may be integrated into a SSD 206. SSD 206 may further include an SSD connector 208 coupling the SSD 206 with a host (e.g., host 108 in FIG. 1). In some examples, the at least one of the storage capacity or operating speed of SSD 206 is greater than at least one of the storage capacity or operating speed of memory card 202.

Figure 3:
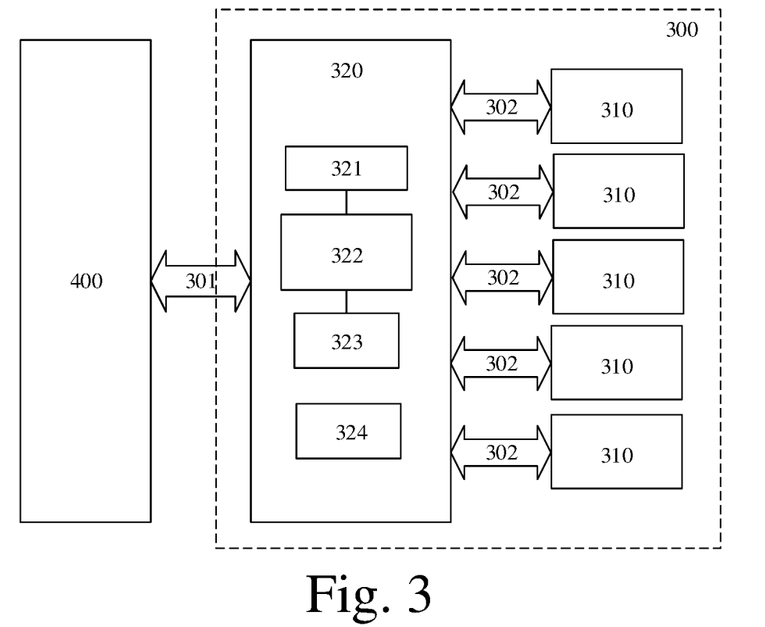
FIG. 3 is a schematic diagram of a memory system, according to some implementations of the present disclosure.

In some examples, as shown in FIG. 3, the memory system 300 uses a non-volatile memory device 310 (e.g., such as a NAND memory) to store user data and a Logical-to-Physical (L2P) Mapping Table corresponding to user data. When data is being read, a portion of the above L2P mapping table will be loaded into the buffer 321 of the memory controller 320. The memory controller 320 uses the logical address provided by the host 400, and utilizes the portion of the L2P mapping table loaded in the buffer 321 to search a physical address in the memory device 310, and then read the corresponding data in the memory device 310 with the searched physical address. In some examples, the buffer 321 in the memory controller 320 includes, but is not limited to, an SRAM, a DRAM, etc.

Figure 4:
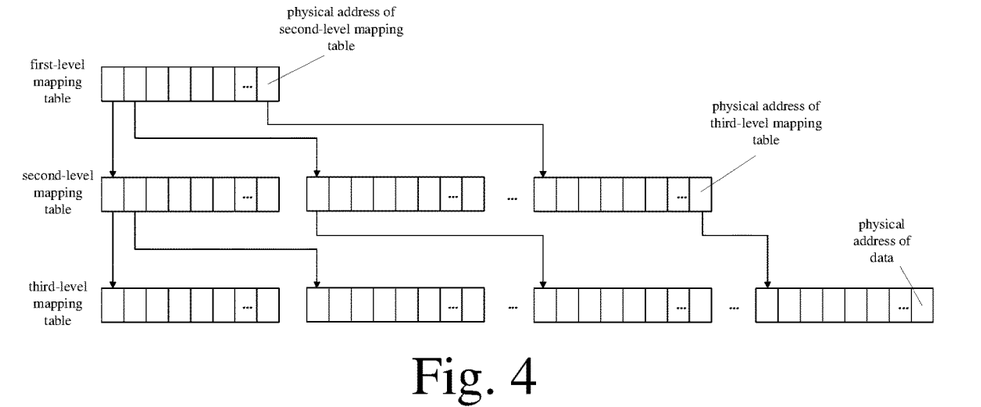
FIG. 4 is a schematic diagram of a multi-level mapping table, according to some implementations of the present disclosure.

Several methods may be applied for storing and maintaining the L2P mapping table. One method is single-level direct L2P mapping, which may contain mapping information for data in an entire memory device. Therefore, the single-level direct page mapping scheme requires a large quantity of storage space (e.g., 1 gigabyte (GB) of data corresponds to the order of storing an L2P mapping table of 1-2 megabyte(s) (MB)) to store the L2P mapping table, which is a challenge for a large-capacity memory device. Another method for storing and maintaining a L2P mapping table is a multi-level mapping scheme. Here, a three-level mapping scheme is taken as an example for illustration, as shown in FIG. 4. For instance, the physical address of a second-level mapping table is stored in a first-level mapping table, and each item of mapping in the first-level mapping table directs to a second-level mapping table. The physical address of a third-level mapping table is stored in a second-level mapping table, and each item of mapping in the second-level mapping table directs to a third-level mapping table. The physical address of data (e.g., such as a physical block number, a physical page number, etc.) is stored in the third-level mapping table, and each item of mapping in the third-level mapping table directs to a physical block or a physical page in a memory device. In some examples, for a memory device with a data storage capacity of 128 GB, the corresponding third-level mapping table has a size of 128

MB, the corresponding second-level mapping table has a size of 128 KB, and the corresponding first-level mapping table has a size of 128 Byte.

A Flash Translation Layer (FTL) 322 may be located in the memory controller 320 and is configured to translate a logical address into a physical address. Due to the limited capacity of the buffer 321 in the memory controller 320, under the multi-level mapping scheme, it is impossible to load all of the multi-level mapping tables into the buffer 321. Therefore, the whole first-level mapping table may be loaded into the buffer 321. For example, the first-level mapping table is resident in the buffer 321, while the second-level mapping table and the third-level mapping table may be partially loaded into the buffer 321. It may be understood that if the flash translation layer 322 may not able to obtain the mapping information required for data reading from the current buffer 32, and an update to at least one of the second-level mapping table or the third-level mapping table stored in the buffer 321 may be required, e.g., reload at least one of a portion of the second-level mapping table or a portion of the third-level mapping table from the memory device 310 into the buffer 321 until the required mapping information is found. It should be noted that, for sequential reading, the mapping information may be continuous. Thus, the performance for sequential reading in the multi-level mapping scheme may be better. For random reading, the mapping information may be scattered. Hence, a plurality of read operations to the memory device 310 may be additionally added to update at least one of the second-level mapping table or the third-level mapping table in the buffer 321, so as to find the mapping information required for random reading. Therefore, the performance for the random reading in the multi-level mapping scheme may be relatively poor. Here, the read delay of the buffer 321 may be on the order of several microseconds, while the read delay of the memory device 310 may be on a greater order, e.g., tens of microseconds.

In some examples, the memory system 300 may be a DRAM-less memory system in which no DRAM is included. For instance, the memory system 300 may be UFS, and the buffer 321 in the memory system 300 may be an SRAM. The fixed capacity in the SRAM may be divided through a method of static allocation to store the multi-level mapping table, while maintaining the SRAM capacity as the buffer space used by other task scheduling of a firmware (FW). The firmware may be stored in the storage medium of the memory device 310 and executed by the control component 323 (e.g., such as a processor) in the memory controller 320.

Figure 5:
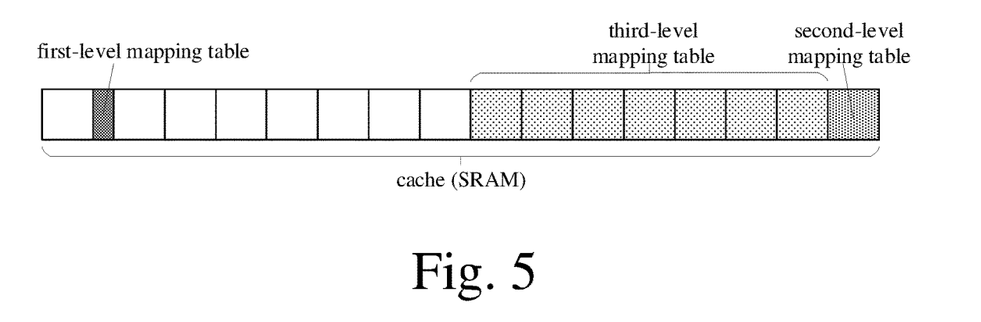
FIG. 5 is a schematic diagram of various levels of mapping tables loaded in a buffer, according to some implementations of the present disclosure.

Taking a memory device with a data storage capacity of 128 GB as an example, as shown in FIG. 5, the total capacity of the SRAM in the memory controller may be 2 MB, and the SRAM may store a first-level mapping table of 128 Byte (e.g., the whole first-level mapping tables in the memory device), a second-level mapping table of 8 KB, and a third-level mapping table of 256 KB, such that a random read operation in the range of 8 GB will not update the second-level mapping table stored in the SRAM. In order to implement a random read operation within 1 GB without updating the third-level mapping table stored in SRAM (e.g., to achieve a 100% buffer hit rate of mapping table), the capacity for storing the third-level mapping table in the SRAM may be expanded from 256 KB to 1024 KB. However, on the basis that the capacities for storing the second-level mapping table and the third-level mapping table in the SRAM are 8 KB and 1024 KB respectively, if a random read operation for a large range occurs, additional times of table lookup will be performed. This may reduce the performance of a random read for a large range. Taking 1000 random reads within the range of 128 GB (e.g., full-disk random read) as an example, as shown in Table 1, the ratio of random read commands, the number of reads for additionally loading the second-level mapping table. Here, the number of reads for additionally loading the third-level mapping table is almost 1:1:1, 1000 random read commands will result in a total of 2931 reads, and the additional 1931 times of reads will seriously affect the performance of the memory system.

It will be understood that buffer space of a memory controller is limited, and if the buffer space of the third-level mapping table continues to be increased for a random read of a large range, the efficiency of the firmware when performing other tasks will be reduced. On the other hand, if the buffer space of the second-level mapping table and the third-level mapping table is not increased, additional times of reads for loading the mapping table will be increased, and the time overhead for random read will increase, which may result result in poor performance of random reading.

TABLE 1

| Actual read times of 1000 random read commands within 128 G range | | |
| --- | --- | --- |
| | The capacity for the third-level mapping table in SRAM is 1024K (Not updated within 1 G range) | The capacity for the second-level mapping table in SRAM is 8K (Not updated within 8 G range) |
| Buffer hit rate | 1/128 | 8/128 |
| Buffer miss rate | 1-1/128 | 1-8/128 |
| The number of reads to additionally load the mapping table | 993 | 938 |
| Total number of reads | 938 + 993 + 1000 = 2931 | |

Referring to FIG. 3, an example of the present disclosure provides a memory system 300. The memory system 300 may include at least one non-volatile memory device 310 and a memory controller 320 coupled to the at least one non-volatile memory device 310. In some implementations, a multi-level mapping table may be stored in the memory device 310, and the multi-level mapping table may be configured to implement mapping from a logical address to a physical address. The memory controller 320 may include a buffer 321, and a portion of the multi-level mapping table may be stored in the buffer 321. The memory controller 320 may be configured to perform a random read operation on the data stored in the memory device 310. In response to the random read range corresponding to the random read operation meeting a preset condition, the memory controller 320 may be configured to adjust the capacity for storing different levels of mapping tables in the buffer 321.

Figure 6:
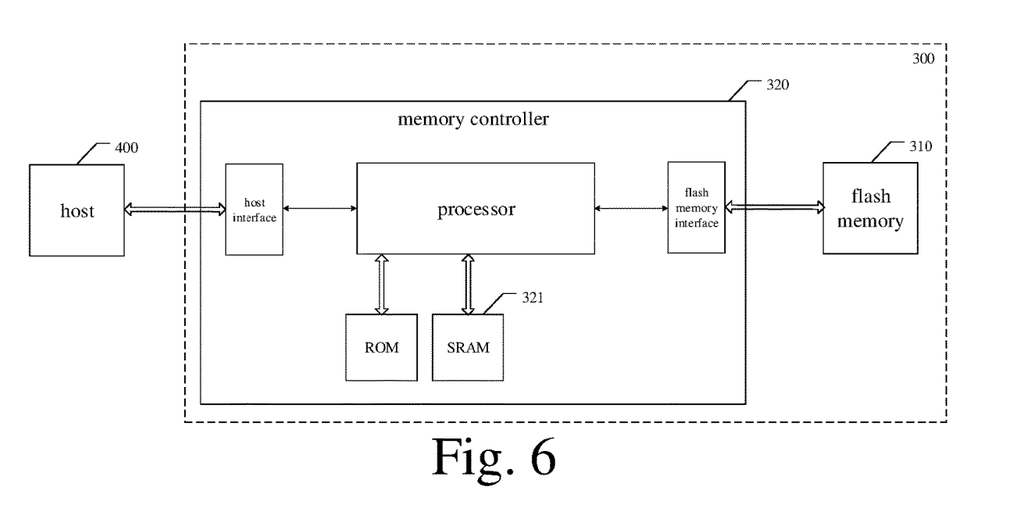
FIG. 6 is a schematic diagram of another memory system, according to some implementations of the present disclosure.

In an example of the present disclosure, the memory controller 320 may be connected to at least one memory device 310. The memory controller 320 may communicate with the host 400 through the host interface 301. The host 400 may send at least one of commands or data through the host interface 301 to request the memory controller 320 to perform read, program, and erase operations of the memory device 310. Memory controller 320 may be configured to retrieve data from one or more memory devices 310 and send the data to host 400 via data bus. The memory device 310 may include one or more memory cell arrays of NAND flash memory. The storage medium of the memory device 310 may store executable instructions, e.g., such as a firmware in an example described above. The memory controller 320 may include one or more buffers 321, the buffers 321 may be high-speed buffers (e.g., such as SRAM). The buffers 321 may be applied for storing any suitable information including L2P mapping tables, software codes, commands, and firmware, so that the memory controller 320 may quickly execute various commands and operations. In some examples, as shown in FIG. 6, the memory device 310 may be a flash memory, and the buffer 321 may be an SRAM. The memory controller 320 includes a processor. The processor may be connected to the host 400 through a host interface, and connected to the memory device 310 through a flash memory interface. The processor may also be connected to the buffer 321 and may obtain L2P mapping information from the buffer 321.

The memory device 310 stores a multi-level L2P mapping table, and the multi-level mapping table may indicate mapping from a logical address to a physical address corresponding to the data stored in the memory device 310. When data is being read, a portion of multi-level mapping table may be loaded from the memory device 310 into the buffer 321. The memory controller 320 may use the logical address provided by the host 400 and utilizes the portion of the L2P mapping table loaded in the buffer 321 to search a physical address in the memory device 310. Then, memory controller 320 may read the corresponding data in the memory device 310 with the searched physical address.

In some examples, the memory controller 320 is configured to perform a random read operation on data stored in the memory device 310 in response to a read command from the host 400. The memory controller 320 detects the random read range with firmware stored in the memory device 310. When the random read range meets the preset condition (e.g., the random read range is greater than a certain value), the memory controller 320 adjusts the capacity for storing the various levels of mapping tables in the buffer 321.

Taking the three-level mapping scheme as an example, it is possible to increase the capacity for the second-level mapping table and reduce the capacity for the third-level mapping table, while maintaining the total capacity for the second-level mapping table and the third-level mapping table (e.g., to adjust the capacity ratio of the second-level mapping table and the third-level mapping table). It is also possible to increase the capacity for the second-level mapping table and the capacity for the third-level mapping table at the same time, or increase the capacity for one of the second-level mapping table and the third-level mapping table (e.g., the total capacity for the second-level mapping table and the third-level mapping table increases). When the random read range does not meet the preset condition, the memory controller 320 may not adjust the capacity for storing the various levels of mapping tables in the buffer 321.

The memory controller 320 may send a mapping table loading instruction to receive an adjusted multi-level mapping table with corresponding capacity from the memory device 310. The adjusted multi-level mapping tabled may be loaded into the buffer 321, and the associated load command may contain the capacity information of the adjusted various levels of mapping tables. The larger the capacity for storing the various levels of mapping tables in the buffer 321, the more mapping information is obtained from the memory device 310 in one load. Thereafter, the memory controller 320 may search the corresponding physical address of the memory device 310 according to the logical address provided by the host 400, and through the portion of multi-level mapping table loaded in the buffer 321. Then, memory controller 320 may read the corresponding data in the memory device 310 with the searched physical address.

It should be noted that an example of the present disclosure may also include a mapping scheme of more than three levels, such as a mapping scheme of four or more levels, which is not limited here. It will be understood that when the memory system includes more than four levels of mapping schemes, adjustment objects may be correspondingly adjusted according to the actual situation. For example, when the memory system includes four levels, the capacity for the second-level mapping table, the third-level mapping table and the fourth-level mapping table may be adjusted, and the capacity for the third-level mapping table and the fourth-level mapping table may also be adjusted. The various adjustment schemes may be adjusted according to the different mapping strategies.

In some examples, when the random read range is less than a certain value, the memory controller 320 may also reduce the capacity for storing different levels of mapping tables in the buffer 321 (e.g., such as reducing the capacity for at least one of the second-level mapping table or the third-level mapping table) to allocate additional buffer capacity for performing other tasks of the firmware to improve utilization of the buffer. It will be understood that, in scenarios such as a sequential read operation or a random read operation for a small range, the memory controller 320 may not adjust the capacity for storing various levels of mapping tables in the buffer 321.

In this way, in one aspect, when a random read operation for a large range is performed, the memory controller 320 may increase the capacity for storing at least one of levels of the mapping table (e.g., such as increasing the capacity for the second level of the mapping table) in the buffer 321. This may improve the buffer hit rate of mapping table, thereby the times of updating the mapping table from the memory device 310 to the buffer 321 may be reduced, the time overhead for searching the corresponding mapping table may be reduced, and the performance of a random read for a large range in the memory system 300 may be improved. In another aspect, dynamically adjusting the capacity for storing different levels of mapping tables in the buffer 321 may improve utilization of the buffer 321 and have little impact on other task scheduling, thereby reducing problems such as buffer resource competition.

In some examples, the memory system 300 may include a DRAM-less memory system, and the buffer 321 may include an SRAM.

In an example of the present disclosure, the memory system 300 may not include a DRAM, e.g., a DRAM-less memory system. In some examples, the buffer 321 in the memory controller 320 may adopt SRAM instead of DRAM. Compared with DRAM, SRAM has higher access speed and lower power consumption, which is beneficial to the performance of the memory system 300.

In some examples, the memory system 300 may include a flash storage, and the memory device 310 includes a NAND memory.

In an example of the present disclosure, the memory system 300 may be a UFS, and the memory device 310 therein may include a NAND memory. UFS has the characteristics of small size, high performance and low power consumption, which is convenient for application in embedded devices and mobile devices. Compared with NOT OR (NOR) flash memory, NAND flash memory has higher storage density, higher erasable times and lower cost per bit. In some examples, the memory system 300 may also include an SSD, an SD card, a CF card, etc.

In some examples, the multi-level mapping table may include a first-level mapping table, a second-level mapping table, . . . , Nth-level mapping table, where N is an integer greater than or equal to three. The physical address of the next-level mapping table may be stored in the previous-level mapping table, and the physical address of data may be stored in the last-level mapping table. The buffer stores at least the whole first M levels of mapping table (e.g., M may be greater than or equal to 1 and less than N), and a portion of each of levels of mapping tables in the subsequent N-M level mapping tables. In some examples, as shown in FIG. 4, the multi-level mapping table may include a first-level mapping table, a second-level mapping table, and a third-level mapping table. A physical address of the second-level mapping table may be stored in the first-level mapping table. A physical address of the third-level mapping table may be stored in the second-level mapping table. A physical address of data may be stored in the third-level mapping table, the whole first-level mapping table. A portion of the second-level mapping table and a portion of the third-level mapping table may be stored in the buffer.

In the example of the present disclosure, since the capacity occupied by the first-level mapping table is small (e.g., the size of the first-level mapping table corresponding to a memory device with a storage capacity of 128 GB is only 128 Byte), the whole first-level mapping table may be loaded into the buffer, while the second-level mapping table and the third-level mapping table in the memory device are partially loaded into the buffer. This may reduce buffer-resource competition.

For ease of understanding, the following multi-level mapping tables are described by taking the three-level mapping table described above as an example. For instance, the memory controller 320 may be configured to, in response to the random read range being greater than or equal to a preset value, increase the ratio of the capacity for storing the second-level mapping table to the total capacity for storing the second-level mapping table and the third-level mapping table in the buffer 321.

In an example of the present disclosure, the memory controller 320 may detect the random read range with firmware stored in the memory device 310. When the random read range is greater than a preset value, the memory controller 320 may increase the ratio of the capacity for storing the second-level mapping table to the total capacity for storing the second-level mapping table and the third-level mapping table in the buffer 321. That is to say, here the memory controller 320 may not increase the total capacity for storing the second-level mapping table and the third-level mapping table in the buffer 321. Instead, on the premise of maintaining the total capacity for the second-level mapping table and the third-level mapping table in the buffer 321 being unchanged, the memory controller 320 may increase the capacity for the second-level mapping table and decrease the capacity for the third-level mapping table.

In some examples, as shown in Table 2, taking 1000 random reads in the range of 128 GB (e.g., the storage data capacity of the memory device is 128 GB-full disk random read) as an example, compared with the example corresponding to Table 1, the memory controller reduces the capacity for the third-level mapping table in the buffer from 1024 KB to 904 KB, and allocates the reduced 120 KB capacity for the third-level mapping table to the second-level mapping table. In other words, the capacity for the second-level mapping table in the buffer may be increased from the original 8 KB to 128 KB. In this way, it may be guaranteed that the random read within the range of 128G does not update the second-level mapping table loaded in the buffer. That is to say, the read times for additionally loading the second-level mapping table is 0, and the increase of read times for additionally loading the third-level mapping table is small, and finally the total read times is reduced from 2931 to 1994, which greatly improves the random read performance of the memory system.

TABLE 2

Adjusted actual read times of 1000 random read commands within 128 GB range

|  | The capacity for the third-level mapping table in buffer is 904 KB | The capacity for the second-level mapping table in buffer is 128 KB |
|---|---|---|
| Buffer hit rate | 904/(1024 × 128) | 128/128 |
| Buffer miss rate | 904/(1024 × 128) | 1-128/128 |
| The number of reads to additionally load the mapping table | 994 | 0 |
| Total number of reads | 994 + 0 + 1000 = 1994 | |

In some examples, the memory controller 320 may be configured to, in response to the random read range being greater than or equal to a preset value, obtain a target buffer hit rate of mapping table. The memory controller 320 may be configured to detect the current buffer hit rate of mapping table. The memory controller 320, in response to the current buffer hit rate of mapping table being lower than the target buffer hit rate of mapping table, increase the ratio of the capacity for storing the second-level mapping table to the total capacity for storing the second-level mapping table and the third-level mapping table in the buffer 321 until the current buffer hit rate of mapping table is greater than or equal to the target buffer hit rate of mapping table.

In some examples, the memory controller 320 may be configured to determine the target buffer hit rate of mapping table according to the random read range.

In some examples, the memory controller 320 may be configured to, in response to the random read range being less than the preset value, maintain the capacity for storing the second-level mapping table and the capacity for storing the third-level mapping table in the buffer 321 being unchanged.

Figure 7:
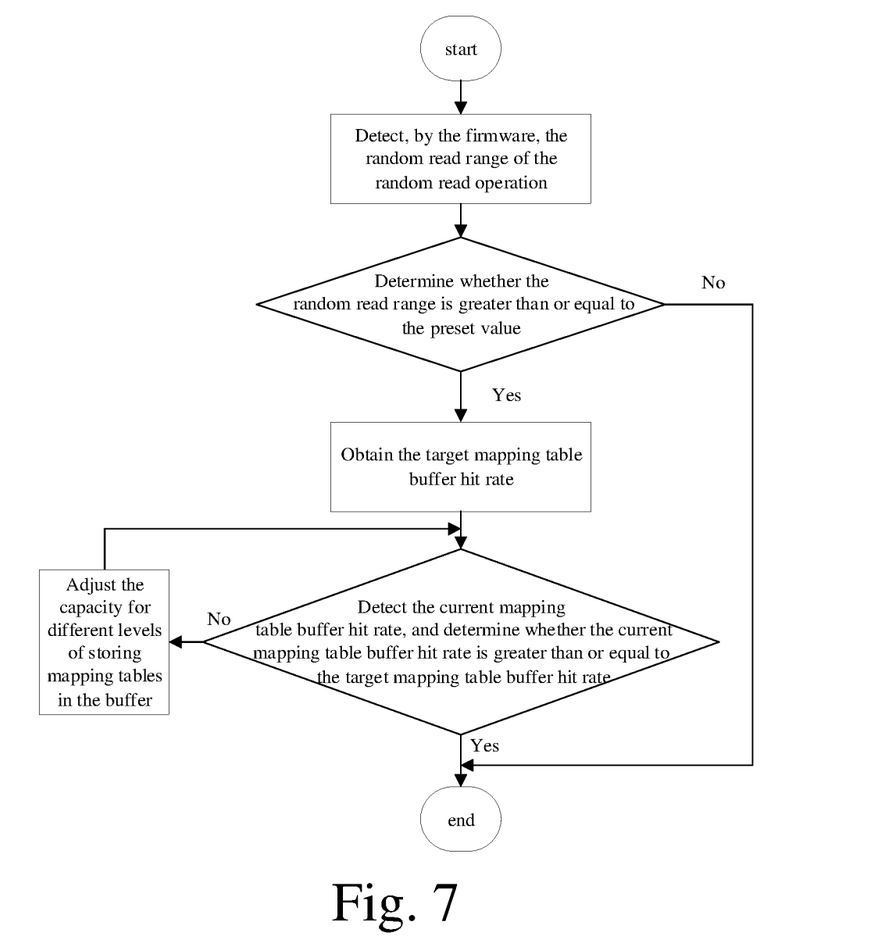
FIG. 7 is a flow chart of operations for a memory controller to adjust the capacities of various levels of mapping tables in a buffer, according to some implementations of the present disclosure.

In an example of the present disclosure, referring to FIG. 7, the memory controller 320 may detect the random read range with firmware stored in the memory device 310. When the random read range is greater than or equal to a preset value, the memory controller 320 may calculate the target buffer hit rate of mapping table according to the random read range and through firmware. The memory controller 320 may detect the current buffer hit rate of mapping table. When the current buffer hit rate of mapping table is lower than the target buffer hit rate of mapping table, the memory controller 320 may adjust the capacity for storing the second-level mapping table and the capacity for storing the third-level mapping table in the buffer 321. When the current buffer hit rate of mapping table is greater than or equal to the target buffer hit rate of mapping table, the memory controller 320 stops adjusting the capacity for storing different levels of mapping tables in the buffer 321. In addition, if the random read range is smaller than the preset value, the memory controller 320 may maintain the capacity for storing the second-level mapping table and the third-level mapping table in the buffer 321 being unchanged.

In this way, the memory controller 320 may adjust the capacity for storing the second-level mapping table and the capacity for storing the third-level mapping table in the buffer 321 multiple times until the current buffer hit rate of mapping table is greater than or equal to the target buffer hit rate of mapping table. By dynamically adjusting the capacities of different levels of mapping tables in the buffer 321 multiple times, the target buffer hit rate of mapping table may be accurately achieved without unduly exceeding the target buffer hit rate of mapping table. As such, the limited buffer resources may be fully utilized and competition for buffer resources may be reduced, while performance of a random read for the large range in the memory system is improved.

In some examples, the memory controller 320 may be configured to, in response to the random read range being greater than or equal to a preset value, increase the total capacity for storing the second-level mapping table and the third-level mapping table in the buffer 321.

In an example of the present disclosure, when the random read range is greater than or equal to the preset value, the techniques by which the memory controller 320 may adjust the capacity for storing the second-level mapping table and the capacity for storing the third-level mapping table in the buffer 321 based on one or more of the non-limiting examples. For instance, the memory controller 320, on the premise of maintaining the total capacity for the second-level mapping table and the third-level mapping table in the buffer 321 being unchanged, may increase the capacity for the second-level mapping table and decrease the capacity for the third-level mapping table. In another example, the memory controller 320 may increase the capacity for at least one of the second-level mapping table and the third-level mapping table in the buffer 321, so that the total capacity for the second-level mapping table and the third-level mapping table increases. Here, increasing the total capacity for storing the second-level mapping table and the third-level mapping table in the buffer 321 may also be implemented through increasing the capacity for one of the second-level mapping table and the third-level mapping table and decreasing the capacity for the other.

It may be understood that increasing the total capacity for storing the second-level mapping table and the third-level mapping table in the buffer 321 may further improve the buffer hit rate of mapping table, which may also improve the performance of a random read for a larger range in the memory system.

In some examples, the memory controller 320 may be configured to determine the difference between the current buffer hit rate of mapping table and the target buffer hit rate of mapping table. The memory controller 320 may, according to the difference, determine increasing quantity of the capacity for storing the second-level mapping table in the buffer 321 in this adjustment. Here, the increasing quantity may be positively correlated with the difference.

In an example of the present disclosure, the memory controller 320 may calculate the target buffer hit rate of mapping table with the firmware stored in the memory device 310. Further, the memory controller 320, according to the random read range, may calculate the difference between the current buffer hit rate of mapping table and the target buffer hit rate of mapping table. Then, the memory controller 320 may determine the increasing quantity of the capacity for storing the second-level mapping table in the buffer 321 in this adjustment according to the difference. The larger the difference, the greater the increasing quantity in the capacity for the second-level mapping table in this adjustment. Conversely, the smaller the difference, the smaller the increasing quantity in the capacity for the second-level mapping table in this adjustment.

In this way, in the case of a large difference, the increasing quantity in this adjustment is large (e.g., the single adjustment amplitude is large), thereby reducing the times of adjustments of the capacity for the multi-level mapping table in the buffer 321 to achieve the target buffer hit rate of mapping table, and to accelerate the adjustment of the mapping table buffer capacity, which may improve the performance of the memory system. In the case of a small difference, the increasing quantity in this adjustment is small to accurately achieve the target buffer hit rate of mapping table, so that the limited buffer resources may be fully utilized.

In some examples, the memory controller 320 may be configured to, in response to the current buffer hit rate of mapping table being lower than the target buffer hit rate of mapping table, and the ratio of the current capacity for storing the second-level mapping table in the buffer 321 to the total capacity for storing the second-level mapping table and the third-level mapping table reaching a preset ratio, stop adjusting the capacity for storing different levels of mapping tables in the buffer 321.

In an example of the present disclosure, the memory controller 320 may also set a preset ratio, e.g., the threshold of the ratio of the current capacity for storing the second-level mapping table in the buffer 321 to the total capacity for storing the second-level mapping table and the third-level mapping table. In the case that the current buffer hit rate of mapping table is still less than the target buffer hit rate of mapping table, and the capacity ratio of the second-level mapping table in the buffer 321 reaches a preset ratio, the memory controller 320 may stop adjusting the capacity for storing different levels of mapping tables in the buffer 321. In this way, the capacity for the second-level mapping table in the buffer 321 will not be undesirably large, thereby preventing the buffer resources required by the third-level mapping table from being occupied. The foregoing preset ratio may be determined according to a proportional relationship between the capacity for the whole second-level mapping table and the capacity for the whole third-level mapping table in the memory device 310.

Figure 8:
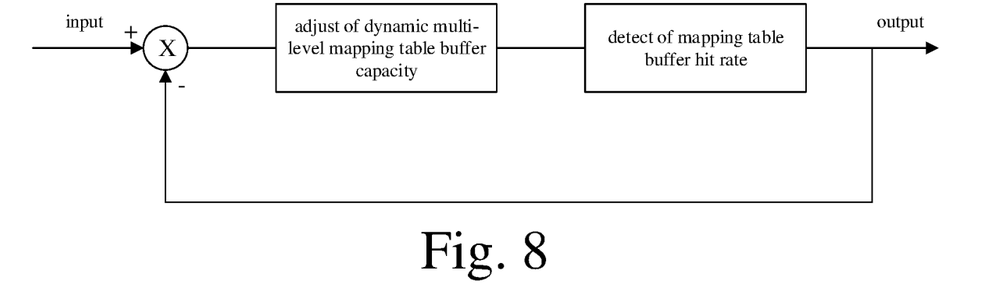
FIG. 8 is a schematic diagram of a negative feedback dynamic adjustment mechanism for a buffer hit rate of mapping table, according to some implementations of the present disclosure.

As shown in FIG. 8, a negative feedback dynamic adjustment mechanism based on the current buffer hit rate of mapping table is depicted. The input is the target buffer hit rate of mapping table Y_In of the second-level mapping table and the third-level mapping table, and the output is the current buffer hit rate of mapping table Y_out of the second-level mapping table and the third-level mapping table, and X represents the comparison node of Y_In and Y_out. On the basis of the current dynamic L2P mapping table buffer algorithm, according to the following formula: Y_out=(Y_In-Y_out), where K is an adjustment coefficient, the current buffer hit rate of mapping table may be dynamically adjusted to achieve the target buffer hit rate of mapping table, thereby improving the performance of a random read for a large range in the memory system.

In some examples, the memory controller 320 may be configured to determine the preset value according to the current capacity for storing the second-level mapping table in the buffer 321 and in combination with mapping rules for various levels of mapping tables.

In an example of the present disclosure, the memory controller 320 may calculate the preset value corresponding to the random read range with the firmware stored in the memory device 310, and according to the capacity for storing the second-level mapping table in the current buffer 321 and the mapping rules for various levels of mapping tables. Here, the mapping rule may refer to the proportional relationship for capacity between the mapping tables of adjacent levels, and between the data stored in the memory device and the lowest level mapping table.

In some examples, taking the three-level mapping scheme as an example, the mapping rule may be that the size of the third-level mapping table is $\frac{1}{1024}$ of the data storage capacity in the corresponding memory device, the size of the second-level mapping table is $\frac{1}{1024}$ of the size of the corresponding third-level mapping table, and the size of the first-level mapping table is $\frac{1}{1024}$ of the size of the corresponding second-level mapping table. That is to say, if the capacity for storing the second-level mapping table in the buffer 321 is 8 KB, then it may be guaranteed that the random read within the range of 8 GB does not update the second-level mapping table in the buffer 321. For example, the preset value may be set to 8 GB at this point, and when the random read range exceeds 8 GB, additional read times will be performed to reload the second-level mapping table from the memory device. At this point, the capacity for storing the multi-level mapping table in the buffer 321 may be adjusted to improve the random read performance of the memory system.

In some examples, the multi-level mapping table may include a first-level mapping table and a second-level mapping table, a physical address of the second-level mapping table may be stored in the first-level mapping table, a physical address of data may be stored in the second-level mapping table, a portion of the first-level mapping table and a portion of the second-level mapping table are stored in the buffer 321. The memory controller 320 may be configured to, in response to the random read range being greater than or equal to a preset value, increase the ratio of the capacity for storing the first-level mapping table to the total capacity for storing the first-level mapping table and the second-level mapping table in the buffer 321.

In an example of the present disclosure, the multi-level mapping table may also be two-levels. In other words, it only includes a first-level mapping table and a second-level mapping table. In this way, when the random read range is greater than or equal to the preset value, the memory controller 320 may increase the ratio of the capacity for storing the first-level mapping table to the total capacity for storing the first-level mapping table and the second-level mapping table in the buffer 321, so as to improve the buffer hit rate of mapping table. Consequently, the times of updating the mapping table from the memory device 310 to the buffer 321 may be reduced, the time overhead for searching the corresponding mapping table may be reduced, and the performance of a random read for a large range in the memory system 300 may be improved.

Referring to FIG. 3, the memory controller 320 may include, e.g., a buffer 321 and a control component 323. The buffer 321 may be configured to store a portion of a multi-level mapping table in the memory device 310. The multi-level mapping table may be configured to implement mapping from a logical address to a physical address. The control component 323 may be configured to perform a random read operation on the data stored in the memory device 310. In response to the random read range corresponding to the random read operation meeting a preset condition, the control component 323 may adjust the capacity for storing different levels of mapping tables in the buffer 321.

In some examples, the memory controller 320 may include, e.g., a flash translation layer 322, connecting the control component 323 and the buffer 321. The flash translation layer 322 may be configured to translate the logical address into a corresponding physical address based on the mapping information in the multi-level mapping table stored in the buffer 321.

In some examples, the control component 323 may be further configured to receive instructions from a host 400 to perform read, write, and erase operations on the memory device 310. The buffer 321 may be further configured to temporarily store data transferred between the host 400 and the memory device 310. The memory controller 320 may further include an encoder/decoder 324 for encoding and decoding data transferred between the host 400 and the memory device 310.

In an example of the present disclosure, the memory controller 320 may include a buffer 321, a flash translation layer 322, a control component 323, and an encoder/decoder 324.

The memory controller 320 may include one or more buffers 321, the buffers 321 may include high-speed buffers (e.g., such as SRAM), and the buffers 321 may be applied for storing any suitable information including L2P mapping tables, software codes, commands, and firmware, so that the memory controller 320 may quickly execute various commands and operations. The flash translation layer 322 may be implemented with the allocation portion and control software of the memory controller 320 circuitry, and is configured to translate a logical address into a physical address.

The control component 323 may include any suitable integrated circuit (e.g., one or more processors), which is configured to receive instructions from the host 400 through the host interface 301 and communicate at least one of commands or data with one or more memory devices 310 via the interface 302 to perform read, program and erase operations of the memory devices 310. For example, if the control component 323 receives a request to access the flash memory medium from the host 400, the control component 323 may also be configured to communicate with other components of the memory controller 320 and control these components. For instance, the control component 323 may instruct the flash translation layer 322 to scan the buffer 321 to obtain mapping information, and send/receive address mapping information from the flash translation layer 322. The control component 323 may also communicate with the encoder/decoder 324 and other suitable components of the memory controller 320.

Encoder/decoder 324 may provide encoding and decoding of data processed by memory controller 320. The encoder/decoder 324 may also generate and store error correction code (ECC) and metadata, and the encoder/decoder 324 may be configured to detect and correct errors in data stored by the memory device.

In some examples, the multi-level mapping table may include a first-level mapping table, a second-level mapping table, and a third-level mapping table. A physical address of the second-level mapping table may be stored in the first-level mapping table. A physical address of the third-level mapping table may be stored in the second-level mapping table. A physical address of data may be stored in the third-level mapping table. The whole first-level mapping table, a portion of the second-level mapping table, and a portion of the third-level mapping table may be stored in the buffer 321. The control component 323 may be configured to, when the random read range is greater than or equal to a preset value, increase the ratio of the capacity for storing the second-level mapping table to the total capacity for storing the second-level mapping table and the third-level mapping table in the buffer 321.

In some examples, the control component 323 may be configured to, when the random read range being greater than or equal to a preset value, obtain a target buffer hit rate of mapping table. The control component 323 may be configured to detect the current buffer hit rate of mapping table. The control component 323 may be configured to, when the current buffer hit rate of mapping table being lower than the target buffer hit rate of mapping table, increase the ratio of the capacity for storing the second-level mapping table to the total capacity for storing the second-level mapping table and the third-level mapping table in the buffer 321 until the current buffer hit rate of mapping table is greater than or equal to the target buffer hit rate of mapping table.

In some examples, the control component 323 may be configured to determine the difference between the current buffer hit rate of mapping table and the target buffer hit rate of mapping table. The control component 323 may be configured to, according to the difference, determine increasing quantity of the capacity for storing the second-level mapping table in the buffer 321 in this adjustment. The increasing quantity is positively correlated with the difference.

In some examples, the control component 323 may be configured to, when the current buffer hit rate of mapping table being lower than the target buffer hit rate of mapping table, and when the ratio of the current capacity for storing the second-level mapping table to the total capacity for storing the second-level mapping table and the third-level mapping table in the buffer 321 reaching a preset ratio, stop adjusting the capacity for storing different levels of mapping tables in the buffer 321.

In some examples, the control component 323 may be configured to determine the target buffer hit rate of mapping table according to the random read range.

In some examples, the control component 323 may be configured to, when the random read range being less than the preset value, maintain the capacity for storing the second-level mapping table and the capacity for storing the third-level mapping table in the buffer 321 being unchanged.

In some examples, the control component 323 may be configured to determine the preset value according to the current capacity for storing the second-level mapping table in the buffer 321 and in combination with mapping rules for various levels of mapping tables.

In some examples, the control component 323 may be configured to, when the random read range being greater than or equal to a preset value, increase the total capacity for storing the second-level mapping table and the third-level mapping table in the buffer 321.

Referring to FIG. 3, the memory system 300 may include at least one non-volatile memory device 310 and a memory controller 320 coupled to the at least one non-volatile memory device 310. A multi-level mapping table may be stored in the memory device 310, and the multi-level mapping table may be configured to implement mapping from a logical address to a physical address. The memory controller 320 may include a buffer 321, and a portion of the multi-level mapping table may be stored in the buffer 321. The memory controller 320 may be configured to perform a random read operation on the data stored in the memory device 310. The memory controller 320 may be configured to, in response to the random read range corresponding to the random read operation meeting a preset condition, adjust the quantity of the capacity for different levels of mapping tables in one loading from the memory device 310 to the buffer 321.

In the example of the present disclosure, the memory controller 320 may be configured to issue a mapping table load command when the random read range meets a preset condition (e.g., the random read range is greater than a certain value), and adjust the quantity of the capacity for different levels of mapping tables in one loading from the memory device 310 to the buffer 321, where "one loading" refers to one read operation of the mapping table.

Taking the three-level mapping scheme as an example, the memory controller 320 may increase the ratio of the capacity for the second-level mapping table to the total capacity for the second-level mapping table and the third-level mapping table in one loading of the mapping table without increasing the total capacity for the second-level mapping table and the third-level mapping table in one loading. In this way, the capacity for storing the second-level mapping table in the buffer 321 increases, but the total capacity for storing the multi-level mapping table in the buffer 321 does not change. As such, the buffer hit rate of mapping table may be improved, the times of additionally loading the mapping table from the memory device 310 to the buffer 321 may be reduced, the time overhead for searching the corresponding mapping table may be reduced, and the performance of a random read for a large range in the memory system 300 may be improved. In addition, dynamically adjusting the quantity of the capacity for different levels of mapping tables in one loading from the memory device 310 to the buffer 321 may improve the utilization of the buffer 321 and have little impact on other task scheduling, thereby reducing buffer resource competition.

It may be understood that, in the case that there is at least one random read operation among multiple random read operations for which the random read range meets the preset condition, since the memory controller 320 adjusts the quantity of the capacity for different levels of mapping tables in one loading from the memory device 310 to the buffer 321, the capacity for the second-level mapping table loaded by at least one random read operation may be different from the capacity for the second-level mapping table loaded by other random read operations. Here it may also be that the capacity for the third-level mapping table loaded by at least one random read operation is different from that of other times.

In some examples, the memory controller 320 may load the multi-level mapping table corresponding to the random read operation into the buffer 321 within a preset number of times of reads, i.e., it is not limited to one loading of the multi-level mapping table to achieve a 100% buffer hit rate of mapping table, but there is no reads for loading the L2P mapping table other than the preset number of reads. Here, the memory controller 320 may calculate the preset read times through firmware and according to the buffer hit rate of the target mapping table, and the buffer hit rate of the target mapping table is less than 100%.

An example of the present disclosure also provides a method of operating a memory system. The memory system may include at least one non-volatile memory device and a memory controller coupled to the at least one non-volatile memory device. A multi-level mapping table may be stored in the memory device, and the multi-level mapping table may be configured to implement mapping from a logical address to a physical address. The memory controller may include a buffer, and a portion of the multi-level mapping table may be stored in the buffer. The method may include performing a random read operation on the data stored in the memory device. The method may include, in response to the random read range corresponding to the random read operation meeting a preset condition, adjusting the capacity for storing different levels of mapping tables in the buffer.

In some examples, the multi-level mapping table may include a first-level mapping table, a second-level mapping table, and a third-level mapping table. A physical address of the second-level mapping table may be stored in the first-level mapping table. A physical address of the third-level mapping table may be stored in the second-level mapping table. A physical address of data may be stored in the third-level mapping table. The whole first-level mapping table, a portion of the second-level mapping table, and a portion of the third-level mapping table may be stored in the buffer. The method may include adjusting the capacity for storing different levels of mapping tables in the buffer in response to the random read range corresponding to the random read operation meeting a preset condition. The method may include, in response to the random read range being greater than or equal to a preset value, increasing the ratio of the capacity for storing the second-level mapping table to the total capacity for storing the second-level mapping table and the third-level mapping table in the buffer.

In some examples, the method may include, in response to the random read range being greater than or equal to a preset value, increasing the ratio of the capacity for storing the second-level mapping table to the total capacity for storing the second-level mapping table and the third-level mapping table in the buffer. The method may include, in response to the random read range being greater than or equal to a preset value, obtaining a target buffer hit rate of mapping table; detecting the current buffer hit rate of mapping table. The method may include, in response to the current buffer hit rate of mapping table being lower than the target buffer hit rate of mapping table, increasing the ratio of the capacity for storing the second-level mapping table to the total capacity for storing the second-level mapping table and the third-level mapping table in the buffer until the current buffer hit rate of mapping table is greater than or equal to the target buffer hit rate of mapping table.

In some examples, referring to FIG. 7, the method of operating the memory system provided by the present disclosure may include the following operations.

For example, at operation S101, the memory system may detect, by the firmware, the random read range of the random read operation.

At operation S102, the memory system may determine whether the random read range is greater than or equal to the preset value; if so, perform operation S103.

At operation S103, the memory system may obtain the target buffer hit rate of mapping table.

At operation S104, the memory system may detect the current buffer hit rate of mapping table, and determine whether the current buffer hit rate of mapping table is greater than or equal to the target buffer hit rate of mapping table; if not, perform operation S105.

At operation S105, the memory system may adjust the capacity for different levels of storing mapping tables in the buffer, and then re-perform operation S104.

The detailed method of operating the memory system may be understood with reference to the specific examples in the foregoing examples, and will not be repeated here.

In some examples, the method further including determining the difference between the current buffer hit rate of mapping table and the target buffer hit rate of mapping table. The method may include, according to the difference, determining increasing quantity of the capacity for storing the second-level mapping table in the buffer in this adjustment. The increasing quantity may be positively correlated with the difference.

In some examples, the method may include, in response to the current buffer hit rate of mapping table being lower than the target buffer hit rate of mapping table, and the ratio of the current capacity for storing the second-level mapping table to the total capacity for storing the second-level mapping table and the third-level mapping table in the buffer reaching a preset ratio, stop adjusting the capacity for storing different levels of mapping tables in the buffer.

An example of the present disclosure provides a storage medium having executable instructions stored thereon, and the executable instructions, when executed by a processor, implement the operations of the method of any one of the examples described above.

In the examples of the present disclosure, the storage medium may include a NAND flash memory in the memory device 310, and executable instructions are stored in the storage medium, where the executable instructions may include the firmware in the examples described above. In this way, the control component 323 including the processor in the memory controller 320 may execute the executable instructions in the storage medium, so as to implement the operations in any one of the methods in the examples described above.

It should be understood that reference throughout the description to "one example" or "an example" means that a particular feature, structure or characteristic related to the example is included in at least one example of the present disclosure. Thus, appearances of "in one example" or "in an example" in various places throughout the description are not necessarily referring to a same example. Furthermore, these particular features, structures or characteristics may be combined in any appropriate manner in one or more examples. It should be understood that in various examples of the present disclosure, sequence numbers of the processes described above do not mean the execution order, and the execution order of each process should be determined by its function and internal logic, and should not constitute any limitation to example process of examples of the present disclosure. The serial numbers of examples of the present disclosure described above are for the purpose of description only, and do not represent the advantages and disadvantages of the examples.

The above is only an example of the present disclosure, and does not limit the scope of the present disclosure, and under the inventive concept of the present disclosure, any equivalent structural transformation made by using content of the present disclosure and the accompanying drawings, or direct/indirect application in other related technical fields are included in the claimed scope of the present disclosure.

In a memory system provided by examples of the present disclosure, a memory device stores a multi-level mapping table, and the buffer of the memory controller may store a portion of the multi-level mapping table, and when the random read range meets a preset condition, the memory controller adjusts the capacity for storing different levels of mapping tables in the buffer. In this way, in one aspect, when a random read operation for a large range is performed, the memory controller may increase the capacity for storing at least one level of the mapping table in the buffer, so as to improve the buffer hit rate of mapping table, thereby the times of updating the mapping table from the memory device to the buffer is reduced, the time overhead for searching the corresponding mapping table is reduced, and the performance of a random read for a large range in the memory system is improved. In another aspect, dynamically adjusting the capacity for storing different levels of mapping tables in the buffer may improve utilization of the buffer and have little impact on other task scheduling, thus reduces problems such as buffer resource competition.

What is claimed is:

1. A memory system, comprising:
   at least one non-volatile memory device in which a multi-level mapping table is stored, the multi-level mapping table being configured to implement mapping from a logical address to a physical address; and
   a memory controller coupled to the at least one non-volatile memory device and including a buffer in which a portion of the multi-level mapping table is stored, the memory controller being configured to:
   perform a random read operation on data stored in the memory device;
   in response to the random read range being greater than or equal to a preset value, obtain a target buffer hit rate of a mapping table of the multi-level mapping table;
   detect a current buffer hit rate of the mapping table of the multi-level mapping table; and
   in response to the current buffer hit rate of mapping table being lower than a target buffer hit rate of the mapping table of the multi-level mapping table, adjust capacity for storing different levels of mapping tables in the buffer.

2. The memory system of claim 1, wherein:
   the multi-level mapping table comprises a first-level mapping table, a second-level mapping table, and a third-level mapping table,
   a physical address of the second-level mapping table is stored in the first-level mapping table, a physical address of the third-level mapping table is stored in the second-level mapping table, a physical address of data is stored in the third-level mapping table, and
   the whole first-level mapping table, a portion of the second-level mapping table, and a portion of the third-level mapping table are stored in the buffer.

3. The memory system of claim 2, wherein, to adjust the capacity for storing the different levels of mapping tables in the buffer, the memory controller is configured to:
   increase a ratio of capacity for storing the second-level mapping table to total capacity for storing the second-level mapping table and the third-level mapping table in the buffer.

4. The memory system of claim 3, wherein, to increase the ratio of capacity for storing the second-level mapping table to the total capacity for storing the second-level mapping table and the third-level mapping table in the buffer, the memory controller is configured to:
   increase the ratio of the capacity for storing the second-level mapping table to the total capacity for storing the second-level mapping table and the third-level mapping table in the buffer until the current buffer hit rate of mapping table is greater than or equal to the target buffer hit rate of mapping table.

5. The memory system of claim 4, wherein the memory controller is configured to:
   determine a difference between the current buffer hit rate of mapping table and the target buffer hit rate of mapping table; and
   determine increasing quantity of the capacity for storing the second-level mapping table in the buffer in this adjustment according to the difference,
   wherein the increasing quantity is positively correlated with the difference.

6. The memory system of claim 4, wherein the memory controller is configured to:
   in response to the current buffer hit rate of mapping table being lower than the target buffer hit rate of mapping table, and a ratio of current capacity for storing the second-level mapping table to the total capacity for storing the second-level mapping table and the third-level mapping table in the buffer reaching a preset ratio, stop adjusting the capacity for storing different levels of mapping tables in the buffer.

7. The memory system of claim 4, wherein the memory controller is configured to:
   determine the target buffer hit rate of mapping table according to the random read range.

8. The memory system of claim 3, wherein the memory controller is configured to:
   in response to the random read range being less than the preset value, maintain the capacity for storing the second-level mapping table and the capacity for storing the third-level mapping table in the buffer being unchanged.

9. The memory system of claim 3, wherein the memory controller is configured to:
   determine the preset value according to a current capacity for storing the second-level mapping table in the buffer and in combination with mapping rules for various levels of mapping tables.

10. The memory system of claim 2, wherein, to adjust the capacity for storing the different levels of the mapping tables in the buffer, the memory controller is configured to:
    increase a total capacity for storing the second-level mapping table and the third-level mapping table in the buffer.

11. The memory system of claim 1, wherein:
    the multi-level mapping table includes a first-level mapping table and a second-level mapping table,
    a physical address of the second-level mapping table is stored in the first-level mapping table, a physical address of data is stored in the second-level mapping table, a portion of the first-level mapping table and a portion of the second-level mapping table are stored in the buffer, and
    to adjust the capacity for storing the different levels of mapping tables in the buffer, the memory controller is configured to:
    increase a ratio of the capacity for storing the first-level mapping table to a total capacity for storing the first-level mapping table and the second-level mapping table in the buffer.

12. The memory system of claim 1, wherein the memory system includes a dynamic random-access memory (DRAM)-less memory system and the buffer includes a static random access memory (SRAM).

13. The memory system of claim 1, wherein the memory system includes a flash storage and the memory device includes a NOT AND (NAND) memory.

14. A method of operating a memory system, comprising:
    performing, by a memory controller coupled to at least one non-volatile memory device and including a buffer in which a portion of a multi-level mapping table is stored, a random read operation on data stored in the at least one non-volatile memory device in which a multi-level mapping table is stored, the multi-level mapping table being configured to implement mapping from a logical address to a physical address;

in response to the random read range being greater than or equal to a preset value, obtaining, by the memory controller coupled to the at least one non-volatile memory device and including the buffer in which the portion of the multi-level mapping table is stored, a target buffer hit rate of a mapping table of the multi-level mapping table;

detecting, by the memory controller coupled to the at least one non-volatile memory device and including the buffer in which the portion of the multi-level mapping table is stored, a current buffer hit rate of the mapping table of the multi-level mapping table; and in response to the current buffer hit rate of mapping table being lower than a target buffer hit rate of the mapping table of the multi-level mapping table, adjusting, by the memory controller coupled to the at least one non-volatile memory device and including the buffer in which the portion of the multi-level mapping table is stored, capacity for storing different levels of mapping tables in the buffer.

15. The method of claim 14, wherein:

the multi-level mapping table includes a first-level mapping table, a second-level mapping table, and a third-level mapping table, a physical address of the second-level mapping table is stored in the first-level mapping table, a physical address of the third-level mapping table is stored in the second-level mapping table, and a physical address of data is stored in the third-level mapping table, the whole first-level mapping table, a portion of the second-level mapping table, and a portion of the third-level mapping table are stored in the buffer, and the method further comprises:

in response to a random read range corresponding to the random read operation meeting a preset condition, adjusting the capacity for storing different levels of mapping tables in the buffer; and in response to the random read range being greater than or equal to a preset value, increasing a ratio of the capacity for storing the second-level mapping table to a total capacity for storing the second-level mapping table and the third-level mapping table in the buffer.

16. The method of claim 15, wherein the adjusting, by the memory controller coupled to the at least one non-volatile memory device and including the buffer in which the portion of the multi-level mapping table is stored, the capacity for storing the different levels of mapping tables in the buffer comprises:

increasing a ratio of a capacity for storing the second-level mapping table to the total capacity for storing the second-level mapping table and the third-level mapping table in the buffer until the current buffer hit rate of mapping table is greater than or equal to the target buffer hit rate of mapping table.

17. The method of claim 16, further comprising:

determining a difference between the current buffer hit rate of mapping table and the target buffer hit rate of mapping table; and according to the difference, determining increasing quantity of the capacity for storing the second-level mapping table in the buffer in this adjustment, wherein the increasing quantity is positively correlated with the difference.

18. The method of claim 16, further comprising:

in response to the current buffer hit rate of mapping table being lower than the target buffer hit rate of mapping table, and the ratio of a current capacity for storing the second-level mapping table to the total capacity for storing the second-level mapping table and the third-level mapping table in the buffer reaching a preset ratio, stopping adjusting the capacity for storing different levels of mapping tables in the buffer.

19. A memory controller, comprising:

a buffer configured to:

store a portion of a multi-level mapping table in a non-volatile memory device, the multi-level mapping table being configured to implement mapping from a logical address to a physical address; and a control component configured to:

perform a random read operation on data stored in the non-volatile memory device;

in response to the random read range being greater than or equal to a preset value, obtain a target buffer hit rate of a mapping table of the multi-level mapping table;

detect a current buffer hit rate of the mapping table of the multi-level mapping table; and in response to the current buffer hit rate of mapping table being lower than a target buffer hit rate of the mapping table of the multi-level mapping table, adjust a capacity for storing different levels of mapping tables in the buffer.

20. The memory controller of claim 19, further including:

a flash translation layer, which connects the control component and the buffer and is configured to:

translate the logical address into a corresponding physical address according to mapping information in the multi-level mapping table stored in the buffer.

* * * * *